United States Patent
Krippendorf et al.

(10) Patent No.: US 8,253,583 B2
(45) Date of Patent: Aug. 28, 2012

(54) HAZARD INDICATOR WITH LED

(75) Inventors: Tido Krippendorf, Erkelenz (DE); Heiner Politze, Neuss (DE)

(73) Assignee: Novar GmbH, Neuss (DE)

( * ) Notice: Subject to any disclaimer, the term of this patent is extended or adjusted under 35 U.S.C. 154(b) by 1150 days.

(21) Appl. No.: 12/115,023

(22) Filed: May 5, 2008

(65) Prior Publication Data

US 2008/0272911 A1 Nov. 6, 2008

(30) Foreign Application Priority Data

May 3, 2007 (DE) .......................... 10 2007 020 769

(51) Int. Cl.
*G08B 5/00* (2006.01)

(52) U.S. Cl. ..................... 340/691.8; 340/653; 340/331; 340/332; 331/108 R; 345/204; 345/214

(58) Field of Classification Search .................. 340/653, 340/691.8, 6.11, 326, 331, 332; 315/307, 315/105, 97, 35; 331/108 R, 109; 345/204–215, 345/690

See application file for complete search history.

(56) References Cited

U.S. PATENT DOCUMENTS

| | | | | |
|---|---|---|---|---|
| 4,003,060 A | * | 1/1977 | Broce et al. | 342/419 |
| 4,622,506 A | * | 11/1986 | Shemanske et al. | 318/786 |
| 6,600,274 B1 | * | 7/2003 | Hughes | 315/291 |
| 2004/0041702 A1 | * | 3/2004 | Toulmin et al. | 340/500 |
| 2006/0038803 A1 | * | 2/2006 | Miller et al. | 345/204 |
| 2007/0080911 A1 | * | 4/2007 | Liu et al. | 345/82 |

FOREIGN PATENT DOCUMENTS

| | | |
|---|---|---|
| DE | 4022498 C2 | 1/1992 |
| EP | 1622106 A1 * | 2/2006 |

* cited by examiner

*Primary Examiner* — Albert Wong
*Assistant Examiner* — Nay Tun
(74) *Attorney, Agent, or Firm* — Edell, Shapiro & Finnan, LLC

(57) ABSTRACT

A hazard indicator including a power-saving control circuit having a transistor with a collector connected via a resistor to the output of the signal processing circuit. In operation, the transistor delivers the clocked control signal for the semiconductor switch as a function of the current-proportional voltage applied to the base of the transistor.

10 Claims, 2 Drawing Sheets

HAZARD INDICATOR WITH LED

CROSS REFERENCE TO RELATED APPLICATIONS

This application claims priority under 35 U.S.C. §119 to Application No. DE 102007020769.9 filed on May 3, 2007, entitled "Hazard Indicator Having LED," the entire contents of which are hereby incorporated by reference.

BACKGROUND

An alarm hazard indicator, e.g., a fire alarm or a security alarm, communicates with a control center either via a two-core line or wirelessly. The indicator typically includes at least one sensor sensitive to a physical variable (e.g., smoke) and a signal processing circuit that activates a high-power LED. The signal processing circuit may activate the LED not only during an alarm, but also during a test operation triggered by the control center. The indicator typically receives its supply voltage via the two-core line (from the control center) or from an installed battery.

Since the power received by the indicator is limited, the LED is often operated via a blink cycle. In a blink cycle, the LED has a frequency of 1 Hz and a short "ON" time (e.g., in the range of approximately 30 ms), The LED may be turned on and off in a rapid pulse sequence in this "ON" time, (e.g., having a pulse duration of 20 µs per pulse period of 200 µs). Regulations, however, are increasingly mandating the LED (e.g., a red LED intrinsic to the indicator) must be illuminated continuously and at a brightness level significantly greater than the operating brightness of the conventional LEDs (e.g., LEDs typically used only for indicating the operating state (e.g., idle, test, and alarm)).

These conventional red LEDs, however, are capable of developing sufficiently high luminosity at higher current level (e.g., a current of about 3 mA). In contrast, typical control centers and indicator lines connected thereto, having up to 256 indicators linked to the control center, are designed for indicators that consume about 100 µA in the idle and/or readiness state at a line voltage of 18 to 19 V. If an indicator having such an LED consumed approximately 3 mA in the alarm state, the line voltage would drop so strongly that only a few indicators in close physical proximity to the control center would function. Consequently, to operate the LEDs "continuously", the above-described blink cycle must be used, since this rapid pulse sequence is perceived like a continuous light by the human eye.

For example, assuming a line voltage of 19 V, for example, an on-state voltage of the LED of 1.6 V, and an ideal switching regulator (having an efficiency of 100%), the indicator would theoretically only still consume approximately 250 µA. The actual current consumption is much higher, however, not only because of the real efficiency of the switching regulator, but also because of the current consumption of the control circuit, which is required for limiting the peak current through the LED to a permissible highest value. This control circuit includes an operational amplifier in a conventional indicator, which has a current consumption of approximately 1 mA during every pulse. This current consumption is tolerable in conventional indicators, since the LED is operated using a current of a few hundred mA, and since the operational amplifier only operates within the short "ON" time of approximately 30 ms (being unpowered during the subsequent pause of approximately 970 ms). For an indicator whose LED is instead to be illuminated continuously for the duration of the alarm state, however, this additional current consumption of the control circuit of the known indicator is not acceptable because its current consumption in the alarm state would thus increase to approximately 1.5 mA, with the result that the number of indicators usable per indicator line would drop very significantly.

SUMMARY

The invention is directed toward a hazard indicator (e.g., a fire or break-in alarm) that communicates with a control center via either a two-core line or wirelessly. The hazard indicator receives its supply voltage via the two-core line from the control center, or from an installed battery. The indicator includes at least one sensor sensitive to a physical variable and a signal processing circuit that generates a voltage or a release signal for an LED control circuit at an output in the alarm state of the indicator.

In the alarm state of the indicator, the signal processing circuit generates a voltage at an output for a control circuit with an output connected to the control input of a semiconductor switch including a load circuit with a freewheeling diode in parallel to a series circuit. The series circuit includes an inductor and an LED and a current measuring resistor for generating a current-proportional voltage, which is applied to an input of the control circuit, to generate a clocked control signal for the semiconductor switch at its output, whose load-side terminal is connected via a clamp diode to the output of the control circuit. The control circuit further includes a transistor whose collector is connected via a resistor to the output of the signal processing circuit. The transistor provides the clocked control signal for the semiconductor switch as a function of the current-proportional voltage applied to the base of the transistor.

In one embodiment of the invention, the operational amplifier of a control circuit is replaced with a single transistor, which, when the alarm is engaged, receives its supply voltage from the signal processing circuit (typically a microcontroller), but initially remains blocked itself. However, due to the supply voltage applied to its collector, switches the semiconductor switch to conductive until the current flowing in the load circuit generates a voltage at the current measuring resistor. This, being the base voltage of the transistor, brings it into the conductive state; consequently, the voltage at the collector of the transistor drops to a value at which the semiconductor switch blocks again. After the decay of the current in the load circuit thus occurring at the time constant essentially determined by the value of the inductance, the transistor is again in the blocking state, so that the supply voltage delivered by the signal processing circuit again switches the semiconductor switch to conductive.

In operation, the control circuit can be configured, for example, to possess a current consumption of less than 500 µA in the alarm state over a supply or input voltage range of 9 V to 18 V. That is, the consumption is less than half the current consumption of the control circuit in a conventional indicator having an LED that is operated via the above-described blink cycle. That is, the inventive control circuit provides continuous LED operation in the alarm state at a lower overall current consumption.

In another embodiment of the invention, the output of the signal processing circuit is connected to the control input of the semiconductor switch and to the collector of a control transistor. A current measuring resistor is connected upstream from the semiconductor switch, and the current-proportional voltage (which drops at the current measuring resistor) controls the control transistor.

With this configuration, the current measuring resistor is no longer in the load circuit but rather is connected upstream from the semiconductor switch. The current measuring resistor, therefore, no longer has current flowing through it during the entire current flow time in the load circuit, but rather only still during the charging time of the inductor (i.e., as long as the semiconductor switch is switched to conductive). This current flow time (both in this and also in the first example) is approximately inversely proportional to the input voltage (i.e., lengthens with falling input voltage). The current consumption of the indicator according to the second example decreases in comparison to the current consumption of the indicator according to the first example by up to 40% depending on the input voltage.

Thus, the present invention may provide a hazard indicator with an LED that provides the impression that it is illuminated continuously in case of alarm or in the test state with the least possible increase of the current consumption of the indicator.

The above and still further features and advantages of the present invention will become apparent upon consideration of the following definitions, descriptions and descriptive figures of specific embodiments thereof, wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

The invention is explained in more detail below with reference to accompanying drawings, where.

Like reference numerals are utilized to designate like components.

DETAILED DESCRIPTION

Figure 1:
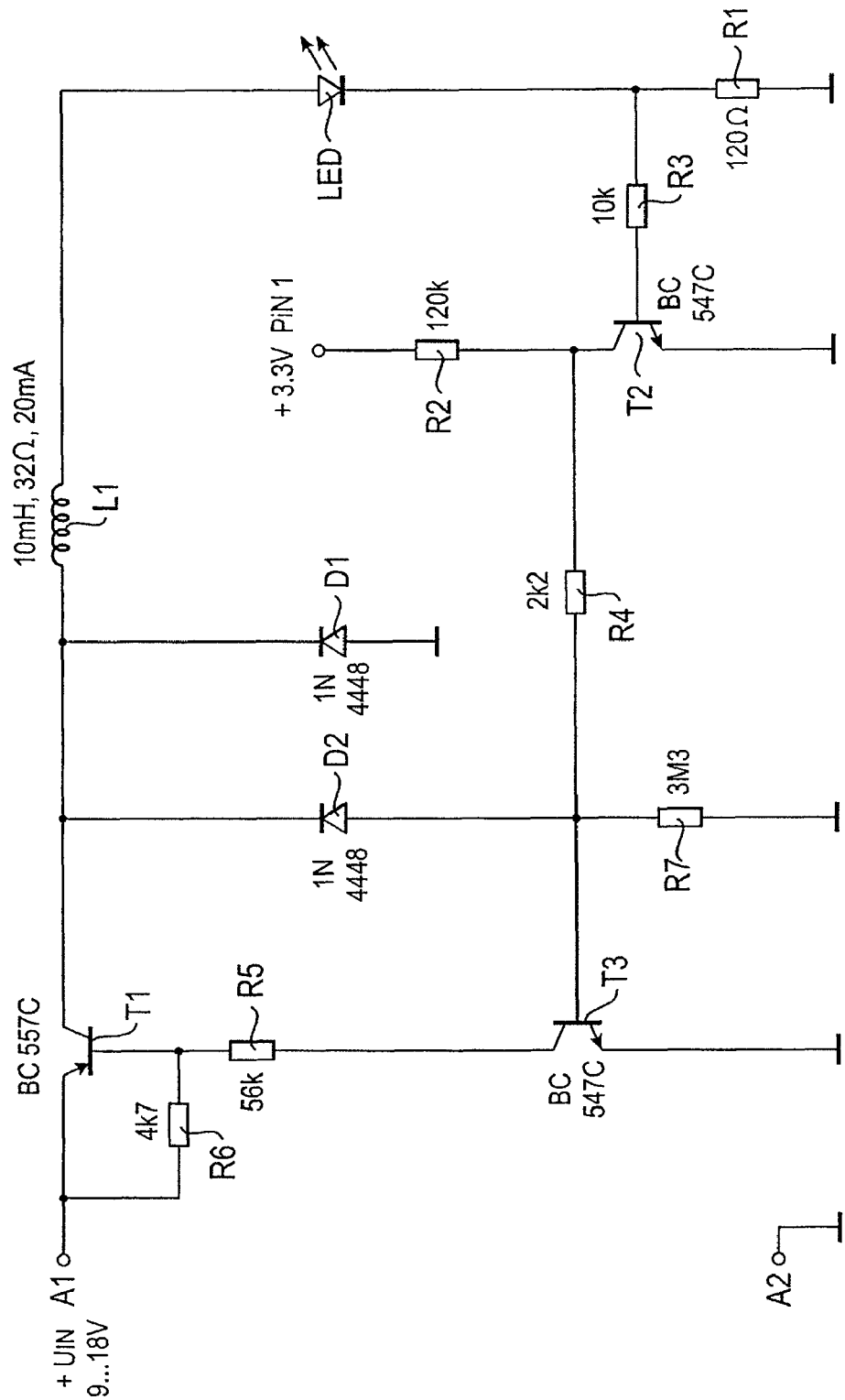
FIG. 1 illustrates an LED control circuit in accordance with an embodiment.

FIG. 1 illustrates a control circuit for a hazard indicator in accordance with an embodiment. The hazard indicator may communicate with a control center, receiving its supply voltage therefrom or from an installed battery. The circuit may include at least one sensor sensitive to a physical variable and a signal processing circuit that generates a voltage or a release signal for an LED control circuit at an output in the alarm state of the indicator.

Specifically, referring to FIG. 1, the control circuit receives a positive supply or input voltage equal to the line voltage of between 9 and 18 V, for example, at the terminal A1. The terminal A2 is grounded. A PNP switching transistor T1, an inductor L1, a low-current LED, and a current measuring resistor R1 are in series between terminals A1 and A2. A freewheeling diode D1 is in parallel to the series circuit including L1 and the LED.

A microprocessor (not illustrated), which forms the signal processing circuit of the indicator, includes the illustrated PIN 1, which has an L-level of about 0 V in the idle or readiness state and an H-level of about +3.3 V in the test or alarm state of the indicator. The collector of a NPN transistor T2 is connected to this PIN 1 via a resistor R2. The emitter of T2 is grounded. The base of T2 is connected via a resistor R3 to the connection point between the LED and the current measuring resistor R1. The collector of T2 is connected via a resistor R4 to the base of a further NPN transistor T3, whose emitter is also grounded and whose collector is connected via a resistor R5 to the base of the switching transistor T1, which is additionally connected via a resistor R6 to the emitter. The base of T3 is connected via a high-ohmic resistor R7 to ground and via a clamp diode D2 to the joint terminal of the collector of the switching transistor T1 and the inductor L1.

The circuit generally operates as follows: As long as PIN 1 is at L=0 V, T2 is not powered; consequently, T3 blocks because of R7. Therefore, T1 is also blocked via R6.

When PIN 1 goes to H=3.3 V, T3 becomes conductive via R2 and R4; consequently, T1 also becomes conductive via R5. T2 initially remains blocked via R3 and R1. During this, a linearly rising current arises in the load circuit L1, LED, and R1, so that the LED begins to illuminate. The current generates a proportional voltage via R1. As soon as this voltage is equal to the base/emitter voltage of T2, i.e., approximately equal to 0.6 V, T2 becomes conductive, so that T3 and thus also T1 blocks. The current in the load circuit now decays exponentially via D1 because of L1. In accordance with the on-state voltage of D1, the cathode of D1 and thus also the cathode of D2 are at approximately −0.6 V in this phase, by which the base of T3 clamps at this potential and thus T3 is kept blocked until the current in the load circuit has completely decayed. After the decay of the current in the load circuit, D2 is again in the blocked state, with the result that the H-level applied unchanged to PIN 1 again switches T3 to conductive.

At the value of L1=10 mH specified in FIG. 1 and a supply voltage of 18 V, the current in the load circuit reaches approximately 5 mA after approximately 4 μs, corresponding to approximately 0.6 V via R1, causing T2 to become conductive, as well as causing T3 and T1 to block. After approximately 23 μs, the current in the load circuit has decayed. A switching frequency of approximately 37 kHz and a mean value of approximately 3 mA for the current through the LED result therefrom. With falling supply voltage, essentially only the time until reaching the peak current in the load circuit lengthens, at which T2 becomes conductive and thus T1 blocks. The brightness of the LED is therefore independent of the supply voltage within wide limits.

To maintain the functional capability of a fire alarm system which comprises indicators having the described LED control circuit, it must be ensured that the LED control circuit is deactivated below a predefined minimum value of the supply voltage. This is achieved by the dimensioning of the ratio of R5 to R6. A shutoff voltage of approximately 7.1 V results using the dimensioning specified in the circuit diagram and a base/emitter voltage of T1 equal to 0.6 V.

The mean current consumption of the circuit is just 500 μA at a supply voltage of 18 V and approximately 600 μA at a supply voltage of 9 V.

By using an inductor having a greater value than the specified 10 mH, i.e., 20 mH, for example, an improvement of the efficiency as a result of lower switching frequency (and thus reduced proportion of the changeover losses) may be achieved.

Additionally, it could also be possible to dispense with D2. T1 would then become conductive again as soon as the current in the load circuit has decayed enough that T2 blocks again. The energy stored in L1 would thus not be completely used. The changeover losses would simultaneously become higher. Without D2, a correspondingly clocked signal, whose pulse pause must be dimensioned sufficiently long that an overload of the LED as a result of switching through T1 before the decay of the preceding current pulse in the load circuit is precluded, could be provided alternatively at PIN 1 instead of a constant H-level for the duration of the alarm state.

In the LED control circuit shown in FIG. 1, the current measuring resistor R1 is continuously in the load circuit, i.e., it consumes power even in the decay phase of the crime pulse, although R1 is only required during the current increase time. This can be avoided utilizing the LED control circuit shown in FIG. 2, with the result of a further reduction of the mean current consumption of the control circuit at identical brightness or luminosity of the LED.

Figure 2:
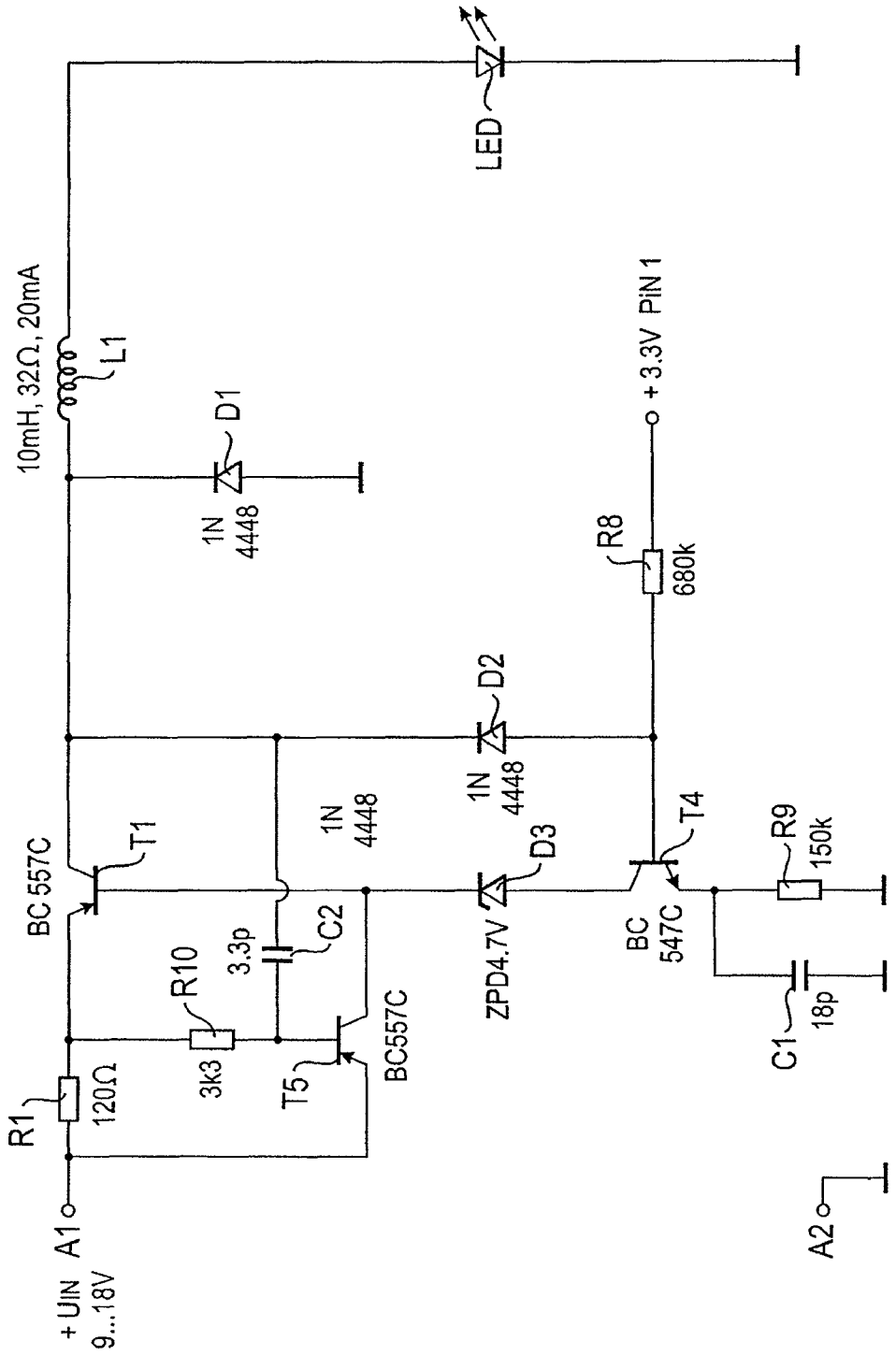
FIG. 2 illustrates an LED control circuit in accordance with another embodiment.

Referring to FIG. 2, showing a control circuit in accordance with an embodiment, a circuit is shown where the current measuring resistor R1 is between the supply voltage terminal A1 and the emitter of the switching transistor T1. The level at PIN 1 reaches the base of a transistor T4 via R8, so that this transistor switches to conductive upon an H level at PIN 1. A current limiting resistor R9 is in the emitter branch of T4, which is bypassed using a small capacitor C1 to accelerate the changeover. The collector of T4 is connected via a Zener diode D3 to the base of the switching transistor T1, so that this switches through. T4 may be dispensed with if PIN 1 provides a base current for T1 sufficient for switching through T1. A resistor may replace D3, whose function is explained below. The current increase in the load circuit L1, LED results in a voltage drop via the current measuring resistor R1. This voltage drop is applied as the base/emitter voltage to a control transistor T5, whose collector is connected to the base of T1. As soon as the load current has again reached its predefined value of approximately 5 mA corresponding to 0.6 V via R1, for example, T5 becomes conductive and thus blocks T1. This shutoff procedure is significantly accelerated by a small capacitor C2 between the base of T5 and the collector of T1.

Otherwise, the function of the LED control circuit from FIG. 2 may be identical to that of the LED control circuit from FIG. 1. In particular, the clamp diode D2 also ensures here that the control circuit is self-oscillating at extremely low power consumption, as long as an H-level is applied to PIN 1. The brightness of the LED is also independent of the supply voltage in this embodiment.

The Zener diode D3 causes a deactivation of the control circuit below a predefined supply voltage. This shutoff voltage is calculated in the specified dimensioning from the H-level of 3.3 V minus the base/emitter voltage of T4 plus the Zener voltage of D3 plus the base/emitter voltage of T1, e.g., 3.3 V−0.6 V+4.7 V+0.6 V=8 V. The shutoff voltage may thus be set very easily by selecting the Zener voltage of D3.

The mean current consumption of the LED control circuit in this embodiment is approximately 280 µA at 18 V and approximately 520 µA at 9 V, so that the power consumption of this embodiment at the same brightness of the LED is approximately 40% less at a supply voltage of 18 V and approximately 10% less at a supply voltage of 9 V than in the case of FIG. 1.

While the present invention has been described in detail and with reference to specific embodiments thereof, it will be apparent to one skilled in the art that various changes and modifications can be made therein without departing from the spirit and scope thereof. It is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

What is claimed is:

1. An indicator system operable in an alarm state, the system comprising:
at least one sensor configured to detect a condition;
a signal processing circuit in communication with the at least one sensor, the signal processing circuit being configured to generate a signal in the alarm state, wherein the signal processing circuit generates a voltage at a signal processing circuit output (PIN);
a control circuit comprising:
semiconductor switch (T1) including a control input connected to the processing circuit output (PIN),
a load circuit in electrical communication with the processing circuit output (PIN), the load circuit comprising:
a freewheeling diode (D1) connected in parallel with a series circuit including an inductor (L1) and a light emitting diode (LED), and
a first, current measuring resistor (R1) configured to generate a current-proportional voltage applied to an input of the control circuit to generate a clocked control signal for the semiconductor switch (T1);
a transistor (T2) including a base and a collector connected to the signal processing circuit output (PIN) via a second resistor (R2), the transistor (T2) delivering the clocked control signal for the semiconductor switch (T1) as a function of the current-proportional voltage applied to the transistor base; and
a further transistor (T3) including:
a collector connected to the control input of the semiconductor switch (T1), and
a base connected to the collector of the transistor (T2) configured to deliver the clocked control signal,
wherein: the semiconductor switch (T1) is connected between a supply voltage and an input to the load circuit, the supply voltage is supplied via a two-core line or from an installed battery, a clamp diode (D2) connects a load-side terminal of the semiconductor switch (T1) to an output of the control circuit, the indicator system is configured to communicate with a control center via the two-core line or wirelessly, the semiconductor switch (T1) comprises a switching transistor including a base connected as a control input to the collector of the further transistor (T3) via a third resistor (R5) and an emitter connected via a fourth resistor (R6) to the base, and wherein the ratio of the resistances of the third and fourth resistors is selected such that the switching transistor remains blocked at a supply voltage which is less than a predefined lower limiting value to deactivate the control circuit.

2. The indicator system of claim 1, wherein:
the clamp diode (D2) is connected between the base of the further transistor (T3) and a connection point disposed between the semiconductor switch (T1) and the load circuit, and
the clamp diode (D1) maintains the further transistor (T3) in a blocking state until a current in the load circuit has decayed to a predetermined value.

3. The indicator system of claim 1, wherein the clamp diode (D2) is connected to the base of the further transistor (T3).

4. An indicator system operable in an alarm state, the indicator system comprising:
at least one sensor configured to detect a condition;
a signal processing circuit in communication with the at least one sensor, the signal processing circuit being configured to generate a signal in the alarm state, the signal processing circuit generating a voltage at a signal processing circuit output (PIN) in the alarm state of the indicator system; and a control circuit including:
semiconductor switch (T1) including a control input and an output,
a load circuit including a freewheeling diode (D1) arranged in parallel to a series circuit comprising an inductor (L1) and a light emitting diode (LED),
a current measuring resistor (R1) configured to deliver a current-proportional voltage operable to determine the cycle of the control signal for the semiconductor switch (T1), the current measuring resistor (R1) being disposed upstream from the semiconductor switch (T1),
a control transistor (T5) including a collector, and
a clamp diode (D2) configured to maintain the semiconductor switch in a blocked state until the current in the load circuit decays to a predetermined level; and
a positive feedback capacitor (C2) connected to both the base of the control transistor (T5) and the output of the semiconductor switch (T5), the positive feedback capacitor (C2) being disposed between the control transistor (T5) and the semiconductor switch (T1),
wherein the signal processing circuit output (PIN) is connected to both the control input of the semiconductor switch (T1) and the collector of the control transistor (T5), and wherein the current-proportional voltage controls the control transistor.

5. The indicator system of claim 4, further comprising a further transistor (T4) including:
a collector connected to the control input of the semiconductor switch (T1) and the collector of the control transistor (T5); and
a base connected to the signal processing circuit output (PIN).

6. The indicator system of claim 5, wherein the further transistor (T4) is operated in a collector base circuit including an emitter resistor (R9) and a positive feedback capacitor (C1) arranged in parallel to the emitter resistor.

7. The indicator system of claim 5, wherein the clamp diode is connected to the base of the further transistor (T4).

8. The indicator system of claim 4, further comprising: a Zener diode connected upstream from the control input of the semiconductor switch.

9. An indicator system operable in an alarm state, the system comprising:
at least one sensor configured to detect a condition;
a signal processing circuit configured to generate a signal in the alarm state, in response to the sensor detecting the condition; and
an indicator circuit comprising:
a load circuit configured to generate a current-proportional voltage, the load circuit comprising a freewheeling diode connected in parallel with a series circuit, the series circuit including: an inductor, a light emitting diode, and a current measuring resistor,
a control circuit configured to output a clocked control signal generated as a function of the current-proportional voltage, in response to receiving the signal generated by the signal processing circuit in the alarm state, the control circuit comprising a transistor including a base to receive the current-proportional voltage and a collector to receive the input signal via a resistor and to deliver the clocked control signal as a function of the current-proportional voltage applied to the base,
a semiconductor switch connected between a supply voltage and an input to the load circuit, the semiconductor switch including:
a control input connected to the output of the control circuit to receive the clocked control signal, the supply voltage being supplied via a two-core line or from an installed battery, and
a switching transistor including a base connected as a control input to the collector of the further transistor via a resistor, and an emitter connected via a further resistor to the base, wherein the ratio of the resistances of the resistors is selected such that the switching transistor remains blocked at a supply voltage which is less than a predefined lower limiting value to deactivate the indicator circuit,
a clamp diode connecting a load-side terminal of the semiconductor switch to an output of the control circuit, and
a further transistor including a collector connected to the control input of the semiconductor switch and a base connected to the collector of the transistor configured to deliver the clocked control signal,
wherein the indicator system is configured to communicate with a control center via the two-core line or wirelessly.

10. An indicator system operable in an alarm state, the indicator system comprising:
at least one sensor configured to detect a condition;
a signal processing circuit configured to generate a signal in the alarm state, in response to the sensor detecting the condition; and
an indicator device including:
a load circuit including a freewheeling diode arranged in parallel to a series circuit comprising an inductor and a light emitting diode;
a current measuring resistor connected configured to deliver a current-proportional voltage;
a control circuit including a control transistor comprising a control input to receive the current-proportional voltage and a collector to receive an input signal in the alarm state;
a semiconductor switch connected between the current-proportional voltage and an input of the load circuit, the semiconductor switch including a control input for receiving the output of the control circuit and the input signal;
a clamp diode; and
a positive feedback capacitor connected between the base of the control transistor and the output of the semiconductor switch,
wherein the current-proportional voltage determines the cycle of the control signal for the semiconductor switch and the clamp diode keeps the semiconductor switch blocked until the current in the load circuit decays in each case.

\* \* \* \* \*